United States Patent
Kats et al.

(10) Patent No.: US 6,812,413 B1
(45) Date of Patent: **\*Nov. 2, 2004**

(54) ELECTRONIC WEIGHING APPARATUS UTILIZING SURFACE ACOUSTIC WAVES

(75) Inventors: Vyacheslav D. Kats, East Rockaway, NY (US); Arnold S. Gordon, Woodmere, NY (US)

(73) Assignee: Circuits and Systems, Inc., East Rockaway, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 10/030,646
(22) PCT Filed: Jun. 8, 2000
(86) PCT No.: PCT/US00/15734
  § 371 (c)(1),
  (2), (4) Date: May 20, 2002
(87) PCT Pub. No.: WO00/75613
  PCT Pub. Date: Dec. 14, 2000

Related U.S. Application Data

(63) Continuation-in-part of application No. 08/729,752, filed on Oct. 7, 1996, now Pat. No. 5,910,647, which is a continuation-in-part of application No. 08/489,365, filed on Jun. 12, 1995, now Pat. No. 5,663,531.

(51) Int. Cl.[7] .............................................. G01G 3/14
(52) U.S. Cl. ........................... 177/210 R; 177/210 FP; 73/862.59
(58) Field of Search ....................... 177/210 R, 210 FP; 73/862.59

(56) References Cited

U.S. PATENT DOCUMENTS

| 3,444,943 A | 5/1969 | Tytus ........................ 177/180 |
| 4,096,740 A | 6/1978 | Sallee ....................... 73/88.5 |
| 4,107,626 A | 8/1978 | Kiewit .................. 177/210 FP |
| 4,249,418 A | * 2/1981 | Ebata ......................... 374/117 |
| 4,294,321 A | 10/1981 | Wittlinger et al. .......... 177/210 |
| 4,489,289 A | * 12/1984 | Slobodnik et al. ....... 331/107 A |
| 4,526,246 A | 7/1985 | Patoray ..................... 177/179 |
| 4,623,813 A | 11/1986 | Naito et al. ............ 177/210 FP |
| 4,718,287 A | * 1/1988 | Mishliborsky ......... 73/862.632 |
| 4,858,145 A | 8/1989 | Inoue et al. ........... 177/210 FP |
| 4,878,552 A | 11/1989 | Gebo et al. ................. 177/212 |
| 4,884,645 A | 12/1989 | Knothe et al. .............. 177/180 |
| 4,957,177 A | 9/1990 | Hamilton et al. ........... 177/211 |

(List continued on next page.)

FOREIGN PATENT DOCUMENTS

RU  9303 9101/10/038680    11/1994

OTHER PUBLICATIONS

"Progress in the development of SAW resonator pressure transducers" by Cullen et al., 1980 Ultrasonics Symposium, pp. 696–701.

"Pressure and acceleration sensitivity of SAW Interferometer" by Staples et al., 1981 Ultrasonics Symposium, pp. 155–158.

"Displacement Measurement by SAW Delay–Line Oscillator Consisting of Two LiNbO$_3$ Plates with IDT" by Ishido et al., 1987 IEEE, pp. 83–86.

"A 200 MHz surface acoustic wave resonator mass microbalance" by Bowers et al., Jun. 1991, Review of Scientific Instruments, pp. 1624–1629.

*Primary Examiner*—Randy W. Gibson
(74) *Attorney, Agent, or Firm*—Gordon & Jacobson, PC

(57) ABSTRACT

A weighing apparatus includes a base (12) supporting a cantilevered elastic member (14) bearing a load platform (16). The interior of the elastic member (14) is hollowed and is provided with first (20) and second (22) piezoelectric transducers mounted on respective opposed posts. The transducers are arranged substantially parallel to each other with a small gap between them and are coupled to an amplifier (950, 952) to form a "delay line" and a positive feedback loop, to form a natural oscillator.

29 Claims, 6 Drawing Sheets

U.S. PATENT DOCUMENTS

| | | | |
|---|---|---|---|
| 5,473,110 A | 12/1995 | Johnson | 174/35 |
| 5,476,002 A | 12/1995 | Bowers et al. | 73/24.01 |
| 5,481,071 A | 1/1996 | Wojnarski | 177/124 |
| 5,521,334 A | 5/1996 | Freeman | 177/154 |
| 5,524,908 A | 6/1996 | Reis | 277/233 |
| 5,527,989 A | 6/1996 | Leeb | 174/35 |
| 5,663,531 A | 9/1997 | Kats | 177/210 FP |
| 5,723,826 A | 3/1998 | Kitagawa et al. | 177/211 |
| 5,910,647 A * | 6/1999 | Kats et al. | 177/210 FP |
| 6,211,473 B1 * | 4/2001 | Kats et al. | 177/210 R |
| 6,448,513 B1 * | 9/2002 | Kats et al. | 177/210 R |

* cited by examiner

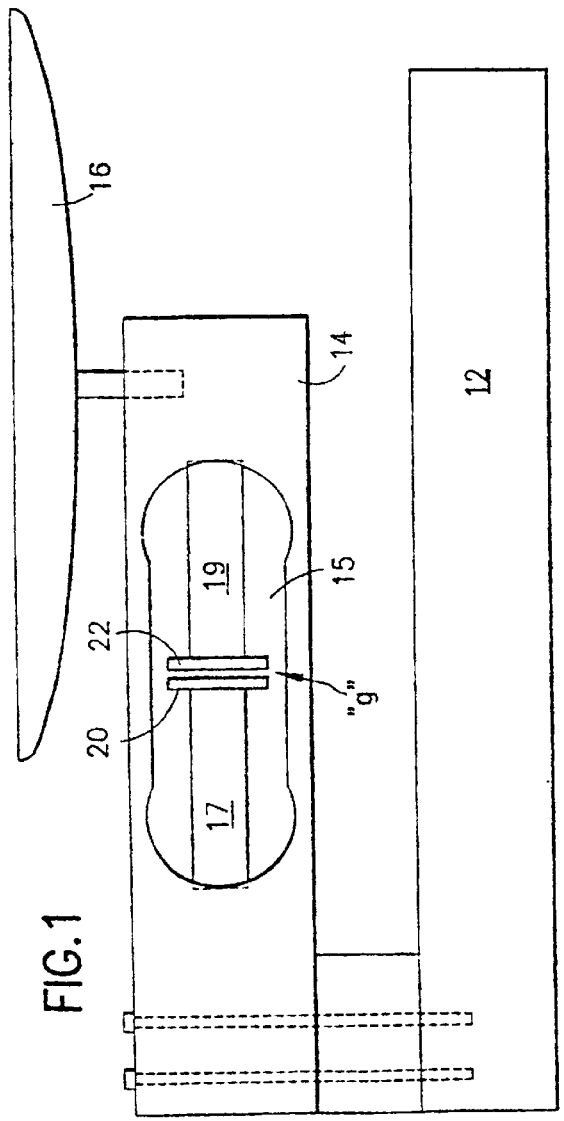
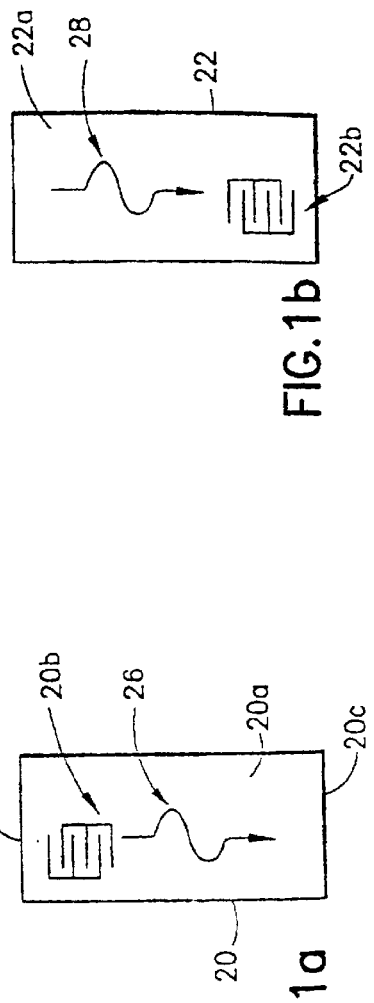
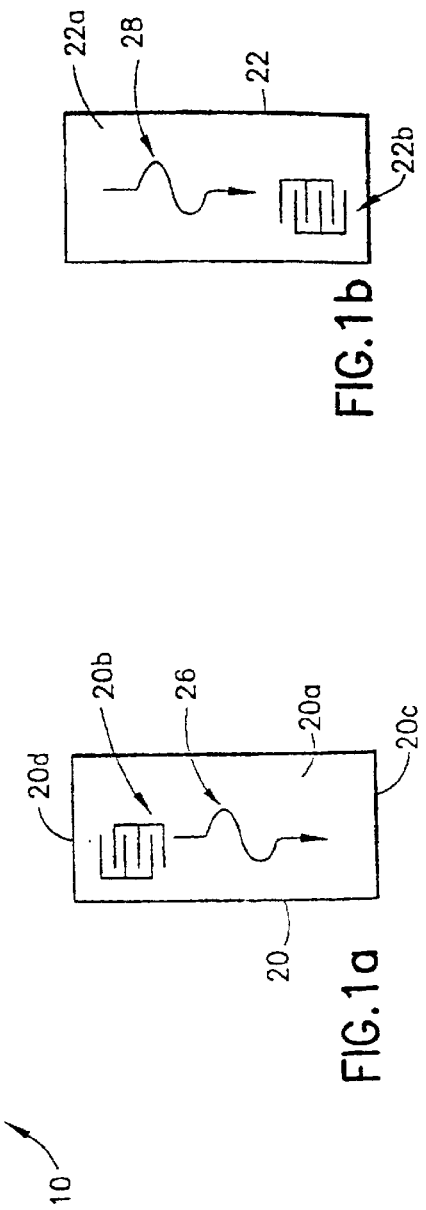

ELECTRONIC WEIGHING APPARATUS UTILIZING SURFACE ACOUSTIC WAVES

This application is a continuation-in-part of co-owned application Ser. No. 08/729,752 filed Oct. 7, 1996, now U.S. Pat. No. 5,910,647, which was a continuation 08/489,365 filed Jun. 12, 1995, now U.S. Pat. No. 5,663,531, the complete disclosures of which are hereby incorporated by reference herein. The subject matter of these U.S. Patents can also be found in WO 98/15803 published Apr. 16, 1998.

BACKGROUND OF THE INVENTION

1. Field of the Invention

The invention relates to electronic weighing devices. More particularly, the invention relates to an electronic weighing device which employs surface acoustic waves to measure weight

2. State of the Art

Precision electronic weighing devices are widely known in the art and there are many different technologies utilized in these electronic weighing devices. Laboratory scales or "balances" typically have a capacity of about 1,200 grams and a resolution of about 0.1 gram, although scales with the same resolution and a range of 12,000 grams are available. The accuracy of these scales is achieved through the use of a technology known as magnetic force restoration. Generally, magnetic force restoration involves the use of an electromagnet to oppose the weight on the scale platform. The greater the weight on the platform the greater the electrical current needed to maintain the weight. While these scales are very accurate (up to one part in 120,000), they are expensive and very sensitive to ambient temperature. In addition, their range is relatively limited.

Most all other electronic weighing devices use load cell technology. In load cell scales, the applied weight compresses a column which has strain gauges bonded to its surface. The strain gauge is a fine wire which undergoes a change in electrical resistance when it is either stretched or compressed A measurement of this change in resistance yields a measure of the applied weight Load cell scales are used in non critical weighing operations and usually have a resolution of about one part in 3,000. The maximum resolution available in a load cell scale is about one part in 10,000 which is insufficient for many critical weighing options. However, load cell scales can have a capacity of several thousand pounds.

While there have been many improvements in electronic weighing apparatus, there remains a current need for electronic weighing apparatus which have enhanced accuracy, expanded range, and low cost Co-owned application Ser. No. 08/489,365, previously incorporated by reference herein, discloses an electronic weighing apparatus having a base which supports a cantilevered elastic member upon which a load platform is mounted. The free end of the elastic member is provided with a first piezoelectric transducer and a second piezoelectric transducer is supported by the base. Each transducer includes a substantially rectangular piezoelectric substrate and a pair of electrodes imprinted on the substrate at one end thereof, with one pair of electrodes acting as a transmitter and the other pair of electrodes acting as a receiver. The transducers are arranged with their substrates substantially parallel to each other with a small gap between them and with their respective electrodes in relatively opposite positions. The receiver electrodes of the second transducer are coupled to the input of an amplifier and the output of the amplifier is coupled to the transmitter electrodes of the first transducer. The transducers form a "delay line" and the resulting circuit of the delay line and the amplifier is a positive feedback loop, i.e. a natural oscillator. More particularly, the output of the amplifier causes the first transducer to emit a surface acoustic wave ("SAW") which propagates along the surface of the first transducer substrate away from its electrodes. The propagating waves in the first transducer induce an oscillating electric field in the substrate which in turn induces similar SAW waves on the surface of the second transducer substrate which propagate in the same direction along the surface of the second transducer substrate toward the electrodes of the second transducer. The induced waves in the second transducer cause it to produce an alternating voltage which is supplied by the electrodes of the second transducer to the amplifier input. The circuit acts as a natural oscillator, with the output of the amplifier having a particular frequency which depends on the physical characteristics of the transducers and their distance from each other, as well as the distance between the respective electrodes of the transducers.

When a load is applied to the load platform, the free end of the cantilevered elastic member moves and causes the first transducer to move relative to the second transducer. The movement of the first transducer relative to the second transducer causes a change in the frequency at the output of the amplifier. The movement of the elastic member is proportional to the weight of the applied load and the frequency and/or change in frequency at the output of the amplifier can be calibrated to the displacement of the elastic member. The frequency response of the delay line is represented by a series of lobes. Each mode of oscillation is defined as a frequency where the sum of the phases in the oscillator is an integer multiple of $2\pi$. Thus, as the frequency of the oscillator changes, the modes of oscillation move through the frequency response curve and are separated from each other by a phase shift of $2\pi$. The mode at which the oscillator will oscillate is the one having the least loss. The transducers are arranged such that their displacement over the weight range of the weighing apparatus causes the oscillator to oscillate in more than one mode. Therefore, the change in frequency of the oscillator as plotted against displacement of the transducers is a periodic function. There are several different ways of determining the cycle of the periodic function so that the exact displacement of the elastic member may be determined. In addition, in order to minimize the possibility that the oscillator will oscillate in two modes at the same time, the frequency response of the delay line is arranged so that no more than two modes coexist in the main lobe of the frequency response curve. This is achieved by the topology of the electrodes as well as the distance between the transmitting electrode and the receiving electrode. The gain of the amplifier is also chosen to be at least the absolute value of the greatest loss expected to be encountered at an oscillating frequency within the main lobe but not great enough to allow oscillation in two modes simultaneously.

According to a disclosed preferred embodiment the surface acoustic wave has a wavelength of approximately 200 microns at 20 MHz. The gap between the substrates of the first and second transducers is as small as possible and preferably is less than 0.1 wavelength, i.e. 10–20 microns. The amplifier preferably has a gain of at least approximately 17 dB in order to guarantee natural oscillation, and preferably not more than approximately 30 dB so that the oscillator oscillates in only one mode at a time. The preferred manner of determining the cycle of the periodic output of the amplifier is to provide a second pair of transducers adjacent to the first pair and coupled to each other in the same type of delay line feedback loop. The second pair of transducers utilize a SAW with a different wavelength than the first pair of transducers, e.g. approximately 220 microns at 18 MHz. The output of the second amplifier is, therefore, a periodic function with a different frequency than he periodic function which is the output of the first amplifier. By combining the outputs of both amplifiers, a unique value is provided for each position of the elastic member.

Typically, the elastic member is chosen so that it will bend up to 150 microns under maximum load. Given the wavelength of the SAW, this results in about two to three modes of oscillation in the output of the first amplifier.

The provided apparatus can theoretically achieve an accuracy on the order of one part in one hundred thousand, e.g. one gram per hundred kilograms. In practice, however, a resolution on the order of one part in fifty thousand is readily achieved. It has been observed by the inventors herein that several factors have varying influence on the accuracy of the SAW system. These factors include reflected waves, temperature changes, and the frequency of the oscillator. Generally, reflected waves result in non-linearity of measurements, and temperature has an effect of about 70 ppm per degree C.

SUMMARY OF THE INVENTION

It is therefore an object of the invention to provide an electronic weighing apparatus which is accurate.

It is also an object of the invention to provide an electronic weighing apparatus which uses surface acoustic waves and is accurate over a broad range of weights.

It is another object of the invention to provide an electronic weighing apparatus which is compact and easy to construct.

It is a further object of the invention to provide an electronic weighing apparatus which is inexpensive to manufacture.

It is another object of the invention to provide an electronic weighing apparatus which utilizes surface acoustic waves and which is provided with means for reducing reflected waves.

It is still another object of the invention to provide an electronic weighing apparatus which maintains accuracy despite temperature gradients within the system.

It is yet another object of the invention to provide an electronic weighing apparatus which utilizes surface acoustic waves at a relatively high frequency.

In accord with these objects which will be discussed in detail below, the improved weighing apparatus of the present invention includes a base which supports a cantilevered elastic member upon which a load platform is mounted. The interior of the elastic member is hollowed and is provided with first and second piezoelectric transducers which are mounted on respective opposed posts. Each transducer includes a substantially rectangular piezoelectric substrate and a pair of electrodes imprinted on the substrate at one end thereof, with one pair of electrodes acting as a transmitter and the other pair of electrodes acting as a receiver. The transducers are arranged with their substrates substantially parallel to each other with a small gap between them and with their respective electrodes in relatively opposite positions. The receiver electrodes of the second transducer are coupled to the input of an amplifier and the output of the amplifier is coupled to the transmitter electrodes of the first transducer. The transducers form a "delay line" and the resulting circuit of the delay line and the amplifier is a positive feedback loop, i.e. a natural oscillator. More particularly, the output of the amplifier causes the first transducer to emit a surface acoustic wave ("SAW") which propagates along the surface of the first transducer substrate away from its electrodes. The propagating waves in the fist transducer induce an oscillating electric field in the substrate which in turn induces similar SAW waves on the surface of the second transducer substrate which propagate in the same direction along the surface of the second transducer substrate toward the electrodes of the second transducer. The induced waves in the second transducer cause it to produce an alternating voltage which is supplied by the electrodes of the second transducer to the amplifier input. The circuit acts as a natural oscillator, with the output of the amplifier having a particular frequency which depends on the physical characteristics of the transducers and their distance from each other, as well as the distance between the respective electrodes of the transducers.

According to the invention, when a load is applied to the load platform, the cantilevered elastic member bends and causes the first transducer to move relative to the second transducer. The movement of the first relative to the second transducer causes a change in the frequency at the output of the amplifier. The bending movement of the elastic member is proportional to the weight of the applied load and the frequency and/or change in frequency at the output of the amplifier can be calibrated to the displacement of the elastic member.

According to one aspect of the invention, one or both substrates are provided with anti-reflection structure which may be an angled cut, a rounded end, or a surface damper.

According to a second aspect of the invention, the transducers are arranged on overlapping substrates which allows more room for a damping material to further reduce reflection and allows more room for additional transducers.

According to a third aspect of the invention, the transducers are coupled to a thermal sink to reduce the effects of thermal gradients across the transducers.

According to a fourth aspect of the invention, two pairs of transducers are provided and arranged to move in opposite directions which doubles the readability of measurements and also compensates for the effects of temperature gradients.

According to a fifth aspect of the invention, a thermal transducer channel is provided on the same substrate to measure the effects of temperature and thereby compensate for temperature effects.

According to a sixth aspect of the invention, a pair of differential transducers is arranged to measure the effects of temperature changes in the same acoustic channel in which displacement measurements are made.

According to a seventh aspect of the invention, a phase shift (preferably 180°) is introduced in the oscillator of the delay line, when required, in order for the oscillator to oscillate in the most optimal section of the frequency response curve (near the center) where temperature effects are minimized.

According to an eighth aspect of the invention, two surface dampers are provided for each transducer. This is accomplished in one of two ways. According to one way, a surface mount damper is formed from a thin mylar film. According to the other way, a multistrip coupler is formed by an aluminized pattern of lines behind the transducer and a surface damper is provided behind the multistrip coupler.

According to a ninth aspect of the invention, long term stability is enhanced by sealing the transducer, preferably hermetically, and/or by providing a second hermetically sealed temperature transducer and by using the output of the sealed transducer to correct for the effects of temperature and humidity.

Additional objects and advantages of the invention will become apparent to those skilled in the art upon reference to the detailed description taken in conjunction with the provided figures.

BRIEF DESCRIPTION OF THE DRAWINGS

FIG. 1 is a schematic side elevation view of an exemplary embodiment of the invention;

FIG. 1a is an enlarged schematic plan view of a first transducer;

FIG. 1b is an enlarged schematic plan view of a second transducer;

DETAILED DESCRIPTION OF THE PREFERRED EMBODIMENTS

Figure 2:
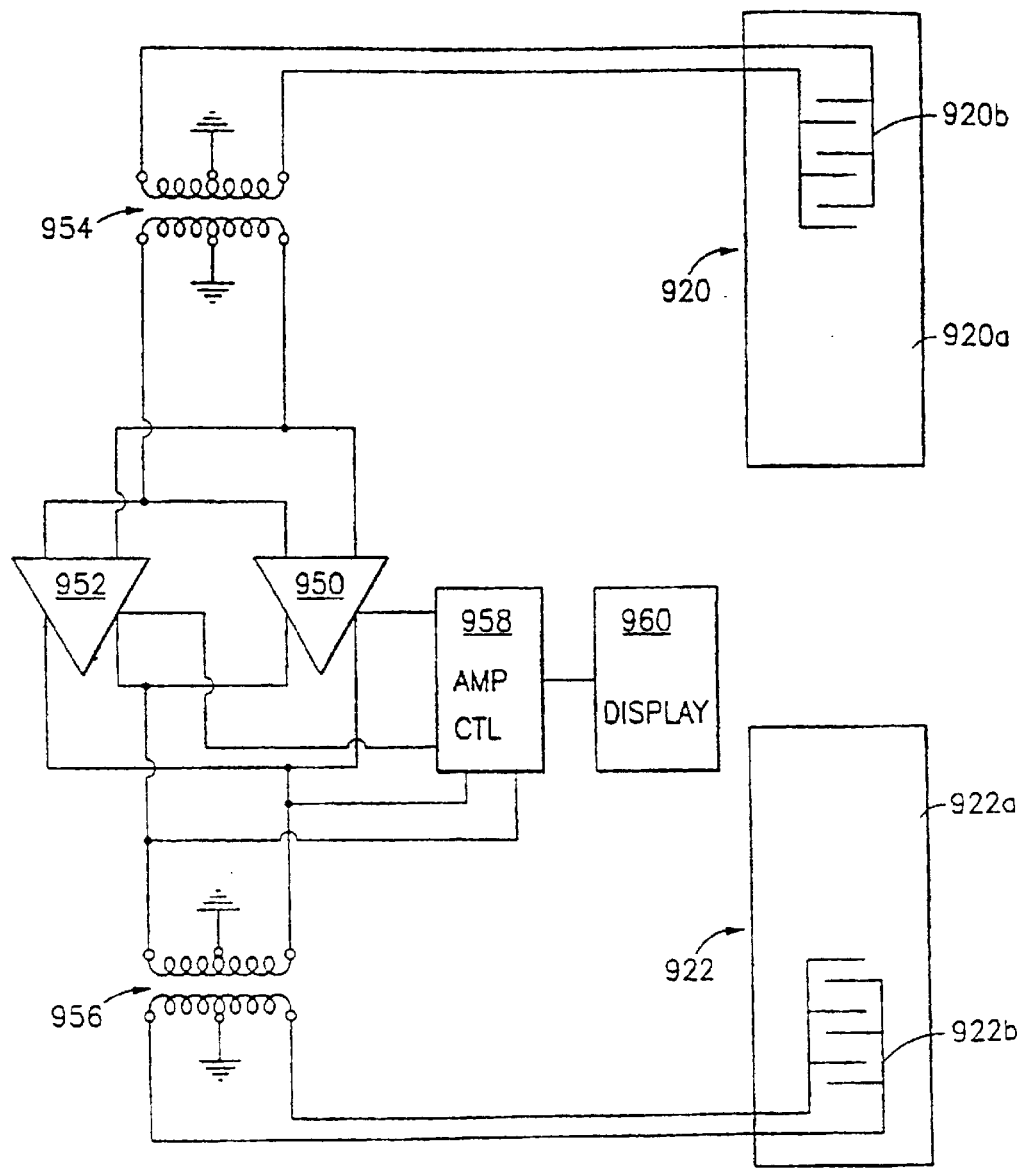
FIG. 2 is a schematic diagram of a positive feedback loop with phase shifting according to the invention.

Referring now to FIGS. 1, 1a, and 1b, an electronic weighing apparatus 10 according to the invention includes a base 12 which supports a cantilevered elastic member 14 having a cut-out 15, and upon which a load platform 16 is mounted. The cut-out 15 is provided with two opposed posts 17, 19 upon which are respectively mounted a first piezoelectric transducer 20 and a second piezoelectric transducer 22. The posts 17, 19 serve to locate the transducers 20, 22 at the center of the elastic member 14 and to mechanically couple the transducers to opposite ends of the elastic member 14.

The first transducer 20 includes a substantially rectangular piezoelectric substrate 20a and a pair of electrodes 20b imprinted on the substrate at the upper end thereof. The second transducer 22 includes a substantially rectangular piezoelectric substrate 22a and a pair of electrodes 22b imprinted on the substrate at the lower end thereof. The substrates are preferably made of Lithium Niobate. The transducers are arranged with their substrates substantially parallel to each other with a small gap "g" between them. The electrodes 22b of the second transducer 22 are coupled to the input of an amplifier (not shown) powered by a power source (not shown) and the output of the amplifier is coupled to the electrodes 20b of the first transducer 20. The circuit arrangement is the same as shown in the parent application Ser. No. 08/489,365, previously incorporated herein by reference. The resulting circuit is a positive feedback loop natural oscillator, a "delay line". The output of the amplifier generates an alternating voltage in the electrodes 20b of the first transducer 20 which generates a surface acoustic wave ("SAW") 26 which propagates along the surface of the first transducer substrate 20a away from its electrodes 20b. Since the substrate 20a of the first transducer 20 is relatively close to the substrate 22a of the second transducer 22, an oscillating electric field which is induced as a result of the SAW waves 26 in the piezoelectric substrate 20a is able to in turn induce similar SAW waves 28 on the surface of the second transducer substrate 22a which propagate in the same direction along the surface of the second transducer substrate toward the electrodes 22b of the second transducer 22. The induced waves 28 in the second transducer 22 cause the electrode 22b of the second transducer 22 to produce an alternating voltage which is provided to the input of the amplifier. As long as the gain of the amplifier 24 is larger than the loss of the system, the circuit acts as a natural oscillator with the output of the amplifier having a particular frequency which depends on the physical characteristics of the transducers and their distance from each other, as well as the distance between the respective electrodes of the transducers. In particular, the frequency of the oscillator is directly related to the time it takes for the SAW to propagate from the electrodes 20b to the electrodes 22b.

According to presently preferred embodiments of the invention, described in more detail below, the SAW 26 has a wavelength of approximately 100–1200 microns at 20–50 MHz. In order to limit loss in the system, the gap "g" between the substrates of the first and second transducers is as small as possible and preferably no more than 0.1 wavelength. In one preferred embodiment described below, the gap is 5–10 microns. With such a gap, an oscillating system can typically be generated if the amplifier 24 has a gain of at least approximately 17 dB. It will be appreciated that when a load (not shown) is applied to the load platform 16, the free end of the cantilevered elastic member 14 moves down and causes the second transducer 22 to move relative to the first transducer 20. In particular, it causes the electrodes 22b of the second transducer 22 to move away from the electrodes 20b of the first transducer 20. This results in a lengthening of the "delay line". The lengthening of the delay line causes an decrease in the frequency at the output of the amplifier. The displacement of the elastic member is proportional to the weight of the applied load and the frequency or decrease in frequency at the output of the amplifier can be calibrated to the distance moved by the elastic member.

It will be appreciated that locating the transducers at the center of the elastic member compensates for any torque on the member which would exhibit itself at the free end of the member. This results in an improved accuracy as compared to the weighing instrument of the parent application. Depending on the application (e.g. maximum load to be weighed), the elastic member is made of aluminum or steel. The presently preferred elastic member exhibits a maximum displacement of 0.1 to 0.2 mm at maximum load.

Referring now to FIG. 2, a simplified delay loop according to the invention includes a first transducer 920, a second transducer 922, a first differential amplifier 950, a second differential amplifier 952, a pair of matching transformers 954, 956, a frequency counter and amplifier controller 958, and an output processor and weight display 960. The first transducer 920 includes a piezoelectric substrate 920a and elects 920*b*. The second transducer 922 includes a piezoelectric substrate 922*a* and electrodes 922*b*. The electrodes 920*b* are coupled via the matching transformer 954 to the inputs of the differential amplifiers 950, 952 in a parallel manner. The electrodes 922*b* are coupled to the outputs of the amplifiers 950, 952 via the matching transformer 956. As shown in FIG. 2, the polarity of the outputs of the amplifier 950 is opposite to the polarity of the outputs of the amplifier 952. In addition, the enable input of each amplifier is coupled to the frequency counter and amplifier controller 958 which is also coupled to the outputs of the amplifiers. According to the invention, the amplifiers 950, 952 are turned on at one time by the frequency counter and amplifier controller 958. It will be appreciated that the phase of the outputs of the amplifiers differs by 180° or π. Thus, in order to apply or remove a phase shift, one of the amplifiers is turned off and the other is turned on. Those skilled in the art will appreciate that other circuits can be utilized to produce substantially the same type of phase shifting and that the circuit of FIG. 2 is merely one example. According to the example shown in FIG. 2, the frequency counter and amplifier controller 958 monitors the output of the amplifier 950 and detects when the frequency passes beyond the optimal gain area as described above, e.g., increases by 100 Khz. When the frequency increases by a preselected amount, the frequency counter and amplifier controller 958 turns off amplifier 950 and turns on amplifier 952. The frequency counter and amplifier controller 958 then monitors the output of amplifier 952. After the frequency increases by an additional preselected amount, e.g. 100 Khz, the frequency counter and amplifier controller 958 turns off amplifier 952 and turns on amplifier 950. While the frequency counter and amplifier controller 958 is monitoring frequencies, the frequencies are passed to the output processor and weight display 960 which analyzes the frequency of oscillation, correlates the frequency with a particular weight according to the methods described in the parent application, and displays the weight.

From the foregoing, as well as from the previously incorporated disclosures, those skilled in the art will appreciate that methods other than the counting of the frequency of the oscillator of the circuit of FIG. 2 can be used to measure displacement and thus weight. For example, a circuit which measures period (the reciprocal of frequency), or a circuit which measures wavelength (period times the speed of propagation) could also be used according to the invention to measure weight. Moreover, a circuit which measures phase shift could also be used according to the invention to measure displacement and thus weight. Further, from the foregoing, as well as from the previously incorporated disclosures, those skilled in the art will appreciate that it may be desirable to measure phase shift to determine the mode of oscillation directly as well as one of frequency, period, or wavelength to determine weight within that mode.

Figure 3:
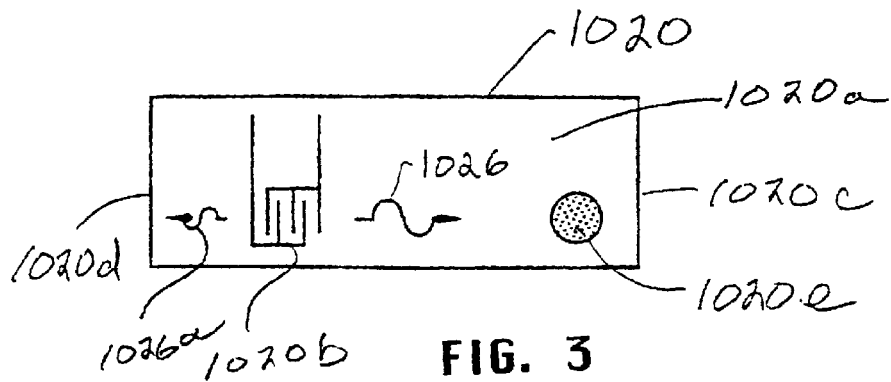
FIG. 3 is an enlarged schematic plan view of a transducer according to the invention illustrating the propagation of SAW waves.
Figure 4:
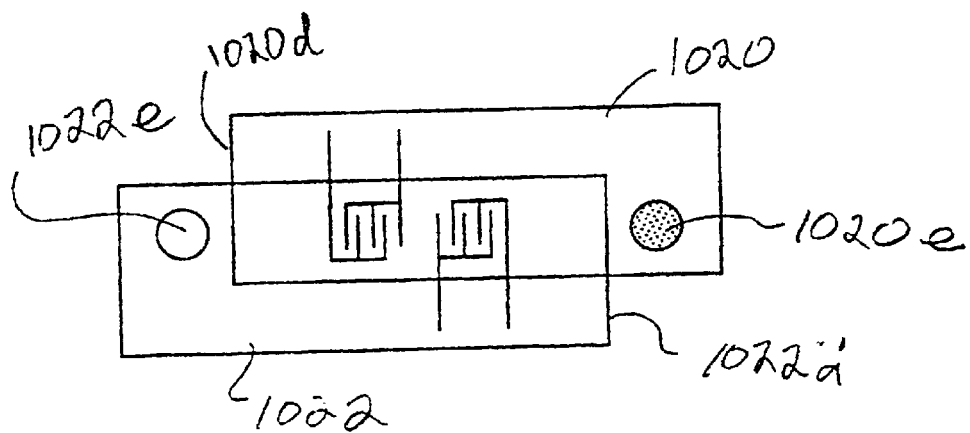
FIG. 4 is a schematic transparent view of two transducers of the type shown in FIG. 3 in operative alignment.
Figure 5:
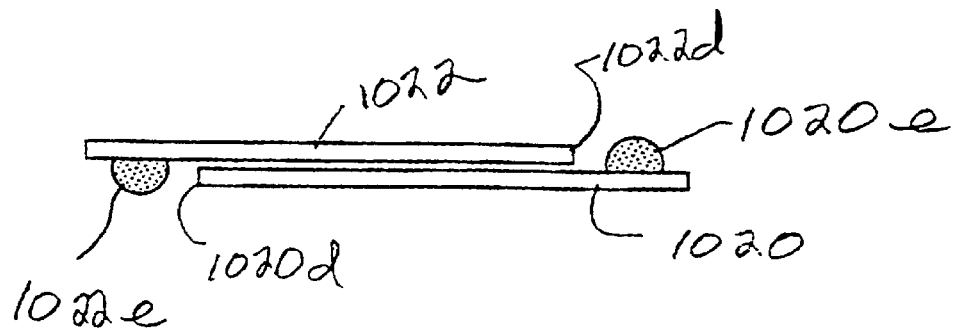
FIG. 5 is an enlarged schematic side elevation view of the transducer system of FIG. 4.
Figure 6:
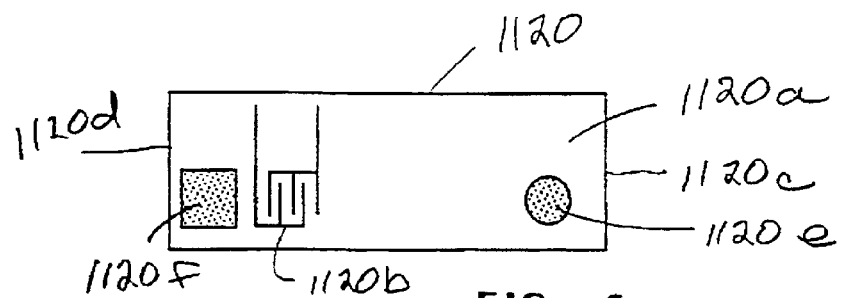
FIG. 6 is a view similar to FIG. 3 showing one embodiment of a transducer with two surface dampers.

Turning now to FIGS. 3–5, those skilled in the art will appreciate that the transducers, e,g, transducer 1020 in FIG. 3 propagate SAW waves in several directions. In a transducer having a so-called "uni-directional topology", a primary SAW wave 1026 is propagated by the electrodes 1020*b* toward the edge 1020*c* and is damped by the anti-reflection damper 1020*e* as described above. Another, albeit lower amplitude SAW wave 1026*a* is propagated in the opposite direction toward edge 1020*d*. It is desirable that additional anti-reflection damping be provided for this wave also. However, as can be seen from FIGS. 4 and 5, there is no room between the transducers 1020 and 1022 to provide dampers like 1020*e* and 1022*e* while still maintaining the close spacing between the transducers. FIG. 6 shows one solution to the problem.

As shown in FIG. 6, the transducer 1120 is provided with a thin anti-reflection damper 120*f* between the electrodes 1120*b* and the edge 1120*d*. The damper 1120*f* is made from a layer of MYLAR which is approximately three microns thick. The MYLAR is glued to the substrate 1120*a*. One disadvantage of this solution is that the glue used to affix the MYLAR is approximately seven microns thick. The resulting thickness of approximately ten microns is too thick to maintain the optimal close spacing desired between two transducers. One alternative is to deposit a layer of silicon oxide or other similar material in place of MYLAR. A different solution is shown in FIGS. 7 and 8.

Figure 7:
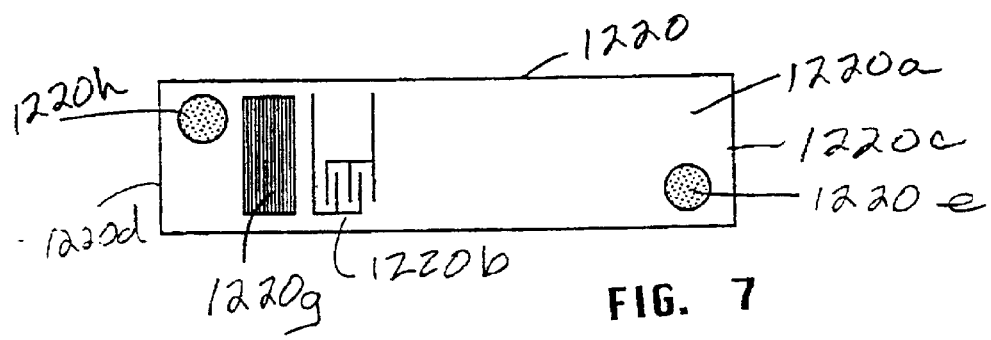
FIG. 7 is a view similar to FIG. 3 showing another embodiment of a transducer with two surface dampers.

The transducer 1220 shown in FIG. 7 is provided with a multistrip coupler 1220*g* and an anti-reflection damper 1220*h* which is similar in size to the damper 1220*e*. The coupler 1220*g* is made from an aluminized pattern which is printed on the substrate 1220*a* and which is designed to redirect SAW waves from the electrodes 1220*b* toward the damper 1220*h*. According to a presently preferred embodiment, the coupler includes one hundred parallel lines spaced with a period of approximately 0.7 times the wavelength of the SAW waves. Those skilled in the art will appreciate that types of couplers, using different patterns, can achieve similar results.

Figure 8:
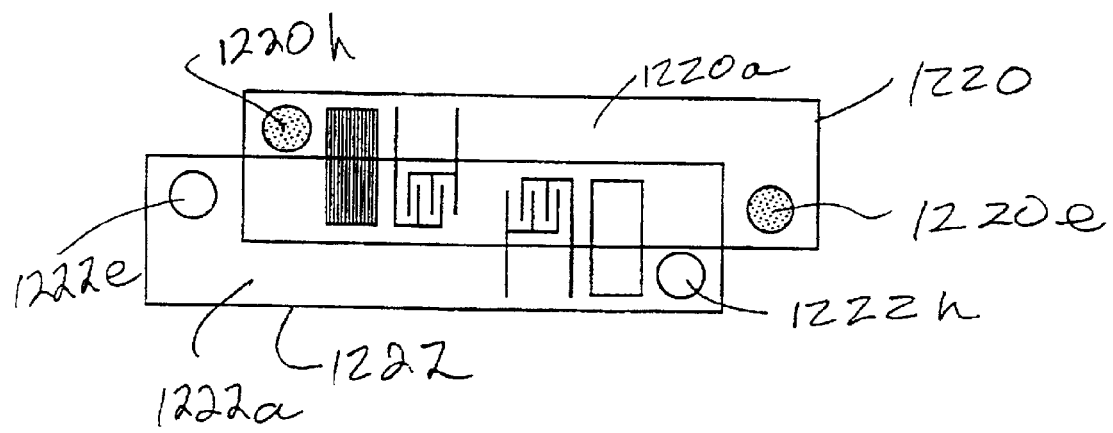
FIG. 8 is a view similar to FIG. 4 showing two of the transducers of FIG. 7 in operative alignment.

As shown in FIG. 8, the arrangement of FIG. 7 allows the close placement of two transducers 1220 and 1222 with relatively thick dampers 1220*c*, 1220*h*, 1222*e*, 122*h* while maintaining a close spacing between the substrates 1220*a*, 1222*a*.

Figure 9:
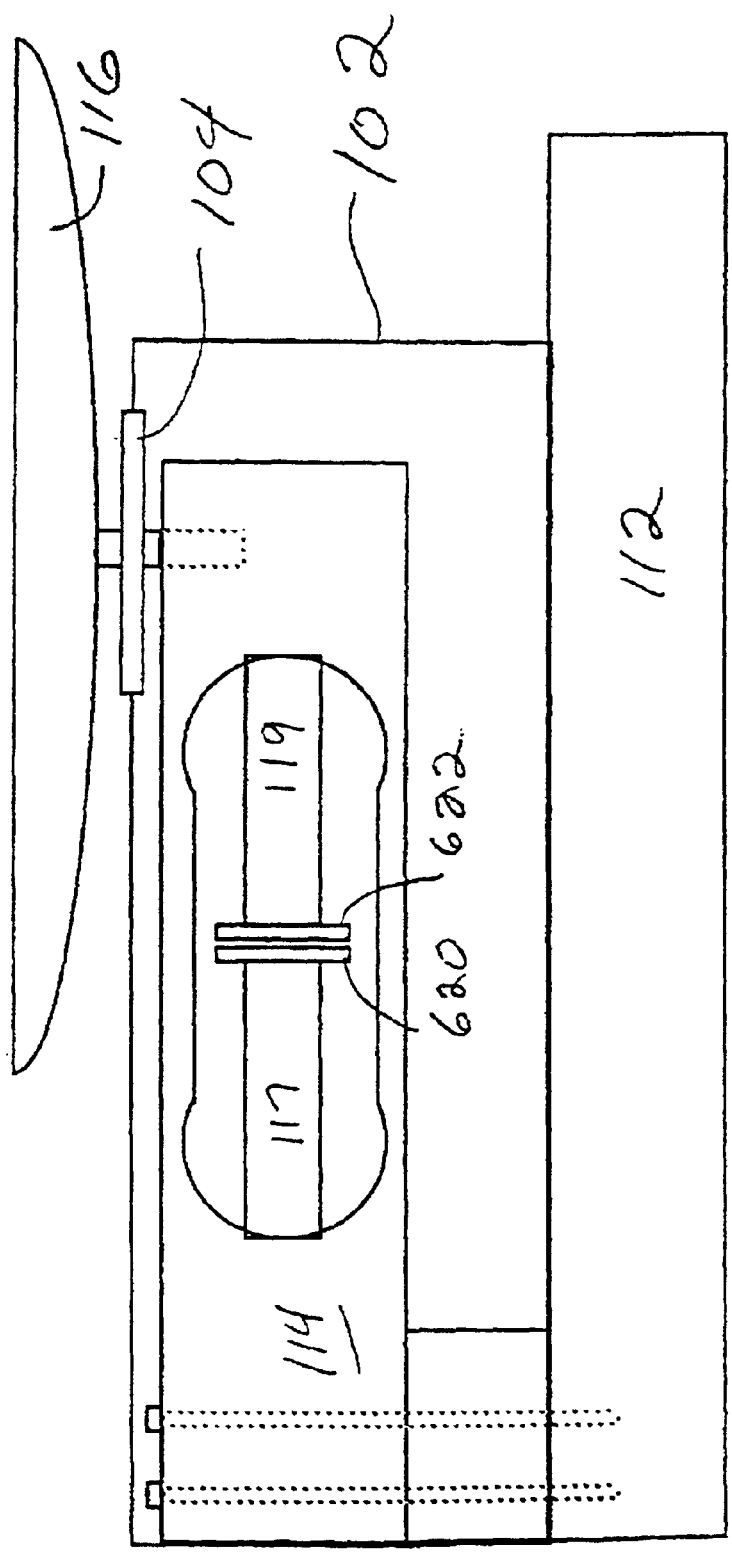
FIG. 9 is a view similar to FIG. 1 illustrating one way of sealing the transducers.

As mentioned above, in order to assure good long term stability, it is desirable that the transducers be sealed. Turning now to FIG. 9, a weighing apparatus 110 is similar to the apparatus 10 shown in FIG. 1 with similar reference numerals (increased by 100) referring to similar structure. As shown in FIG. 9, transducers 620, 622 (having on board temperature sensors) are sealed by providing a sealing box 102 which covers the entire elastic member 114. A rolling diaphragm 104 permits movement of the elastic member 114 and the load platform 116 relative to the box 102.

Figure 10:
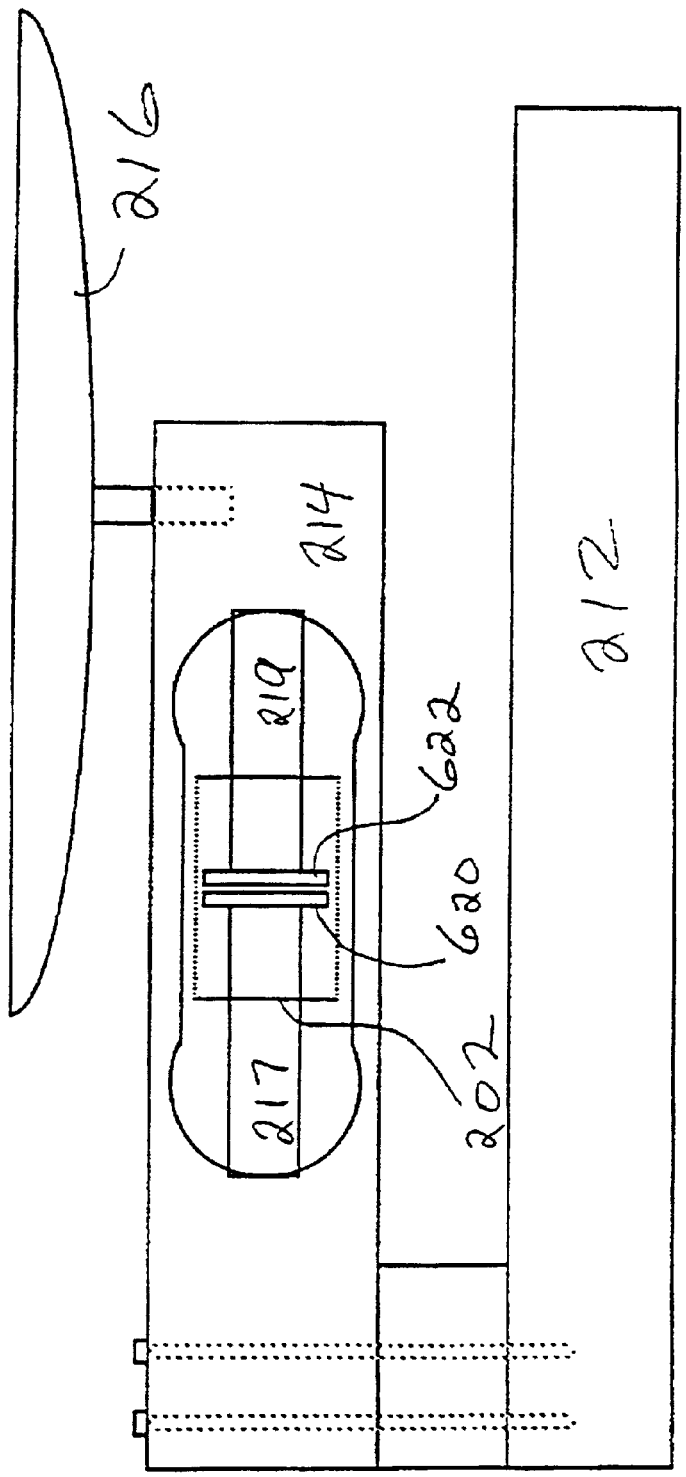
FIG. 10 is a view similar to FIG. 1 illustrating another way of sealing the transducers.

Another way to seal the transducers is shown in FIG. 10 which illustrates a weighing apparatus 210 similar to the apparatus 10 shown in FIG. 1 with similar reference numerals (increased by 200) referring to similar structure. According to this embodiment, a flexible sleeve 202 is placed over the transducers 620, 622 and sealed to the posts 217, 219. The sleeve may be made of a light weight LATEX or similar material. It will be appreciated that other methods of sealing the transducers can yield similar results.

As mentioned above, the effects of temperature and long term degradation can be further corrected by providing a separate hermetically sealed SAW temperature sensor (which senses change in temperature as a change in frequency) in addition to the temperature sensors on board the transducers in the elastic member. This is particularly useful if the temperature sensors on board the transducers in the elastic member are not hermetically sealed or if the seal (102, 202) is not perfectly hermetic. According to this aspect of the invention, two weight corrections can be made based on the temperature sensed by the hermetically sealed unit. As shown in Equation 1, the effects of temperature on the elastic member (114, 214) can be compensated for to yield a corrected weight Wc from a non-corrected weight Wn based on the temperature To in ° C. of the hermetically sealed transducer at the time the weight is measured and the temperature Tc in ° C. of the hermetically sealed transducer at the time the unit was calibrated.

$$Wc = Wn + (Wn * (Tc - To) * (55 \times 10^{-5})) \quad (1)$$

The constant $55 \times 10^{-5}$ is based on a Youngs modulus as well as other parameters for a particular aluminum elastic member. Other elastic members will require a different constant. It will be appreciated that Equation 1 may be implemented using any highly accurate temperature sensor. As shown in Equation 2, long term effects (such as absorption of water vapor and other degradation effects due to incomplete sealing) on the weight measuring transducer can be compensated for to yield a corrected weight Wc based on the uncorrected weight Wn, the reading Th (in Mhz) sensed by the hermetically sealed transducer, and the reading Tn (in Mhz) sensed by the non-sealed temperature sensor, where fc is the center frequency (in Mhz) for both sensors.

$$Wc = Wn - \left( Wn * \frac{Th - Tn}{fc} \right) \quad (2)$$

There have been described and illustrated herein several embodiments of an electric weighing apparatus utilizing surface acoustic waves. While particular embodiments of the invention have been described, it is not intended that the invention be limited thereto, as it is intended that the invention be as broad in scope as the art will allow and that the specification be read likewise. Thus, while particular geometries of the base, elastic member, and load platform have been disclosed, it will be appreciated that other geometries could be utilized. Also, while particular wavelengths have been disclosed, it will be recognized that other wavelengths could be used with similar results obtained. As mentioned above, rather than measuring frequency, period, wavelength or phase may be measured to determine weight. Measuring one of these other characteristics can help in high speed weighing, e.g. twenty readings or more per second. Moreover, while particular configurations have been disclosed in reference to the location of transmitting and receiving electrodes, it will be appreciated that the respective locations of transmitters and receivers could be reversed. Furthermore, while several different aspects of the invention have been disclosed as solving various problems, it will be understood that the different aspects of the invention may be used in combination with each other in configurations other than those shown. It will therefore be appreciated by those skilled in the art that yet other modifications could be made to the provided invention without deviating from its spirit and scope as so claimed.

What is claimed is:

1. An electronic weighing apparatus, comprising:
   a) a displaceable elastic member means for receiving a load and being displaced by the load such that the displacement of said elastic member means is related to the weight of the load;
   b) a first piezoelectric transducer having a first substrate and one of a first surface acoustic wave (SAW) transmitter and a first SAW receiver, said first piezoelectric transducer being coupled to said elastic member;
   c) a second piezoelectric transducer having a second substrate and the other of said first SAW transmitter and said first SAW receiver, said second piezoelectric transducer being mounted in close proximity to said first piezoelectric transducer such that said displacement of said elastic member causes a corresponding displacement of one of said first and second piezoelectric transducers relative to each other;
   d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency;
   e) processor means coupled to said output of said first amplifier; and
   f) sealing means covering said first and second piezoelectric transducers for sealing out moisture and other contaminants, wherein
      displacement of said elastic member means causes a displacement of one of said first and second piezoelectric transducers relative to each other and thereby changes said first output frequency, and said first output frequency is used by said processor means to determine an indication of the weight of the load.

2. An electronic weighing apparatus according to claim 1, wherein:
   said sealing means is an hermetic seal.

3. An electronic weighing apparatus according to claim 1, wherein:
   said sealing means is a flexible sleeve.

4. An electronic weighing apparatus, comprising:
   a) a displaceable elastic member means for receiving a load and being displaced by the load such that the displacement of said elastic member means is related to the weight of the load;
   b) a first piezoelectric transducer having a first substrate and one of a first surface acoustic wave (SAW) transmitter and a first SAW receiver, said first piezoelectric transducer being coupled to said elastic member;
   c) a second piezoelectric transducer having a second substrate and the other of said first SAW transmitter and said first SAW receiver, said second piezoelectric transducer being mounted in close proximity to said first piezoelectric transducer such that said displacement of said elastic member causes a corresponding displacement of one of said first and second piezoelectric transducers relative to each other;
   d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency;
   e) processor means coupled to said output of said first amplifier; and
   f) an hermetically sealed temperature sensor having an output coupled to said processor means, wherein
      displacement of said elastic member means causes a displacement of one of said first and second piezoelectric transducers relative to each other and thereby changes said first output frequency, and said first output frequency is used by said processor means to determine an indication of the weight of the load and said processor means uses said output of said hermetically sealed temperature sensor to compensate for the effects of temperature on said output of said first amplifier.

5. An electronic weighing apparatus, comprising:
   a) a displaceable elastic member means for receiving a load and being displaced by the load such that the displacement of said elastic member means is related to the weight of the load;

b) a first piezoelectric transducer having a first substrate and one of a first surface acoustic wave (SAW) transmitter and a first SAW receiver, said first piezoelectric transducer being coupled to said elastic member;

c) a second piezoelectric transducer having a second substrate and the other of said first SAW transmitter and said first SAW receiver, said second piezoelectric transducer being mounted in close proximity to said first piezoelectric transducer such that said displacement of said elastic member causes a corresponding displacement of one of said first and second piezoelectric transducers relative to each other;

d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency; and e) processor means coupled to said output of said first amplifier, wherein
one of said first and second piezoelectric transducers is provided with two anti-reflection structures to minimize reflection of surface acoustic waves, and
displacement of said elastic member means causes a displacement of one of said first and second piezoelectric transducers relative to each other and thereby changes said first output frequency, and said first output frequency is used by said processor means to determine an indication of the weight of the load.

6. An electronic weighing apparatus according to claim 5, wherein:
one of said two anti-reflection structures is a MYLAR film glued to said substrate.

7. An electronic weighing apparatus according to claim 5, wherein:
one of said two anti-reflection structures is a surface damper on said substrate with a multistrip coupler located between said surface damper and said SAW transmitter or receiver.

8. An electronic weighing apparatus according to claim 5, wherein:
one of said two anti-reflection structures is a layer of silicon oxide.

9. An electronic weighing apparatus, comprising:

a) a displaceable elastic member means for receiving a load and being displaced by the load such that the displacement of said elastic member means is related to the weight of the load, said elastic member having a hollowed central portion;

b) a first piezoelectric transducer having a first substrate and one of a first surface acoustic wave (SAW) transmitter and a first SAW receiver, said first piezoelectric transducer being coupled to said elastic member within said hollowed central portion;

c) a second piezoelectric transducer having a second substrate and the other of said first SAW transmitter and said first SAW receiver, said second piezoelectric transducer being mounted in close proximity to said first piezoelectric transducer such that said displacement of said elastic member causes a corresponding displacement of one of said first and second piezoelectric transducers relative to each other;

d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency; and e) processor means coupled to said output of said first amplifier, wherein
displacement of said elastic member means causes a displacement of one of said first and second piezoelectric transducers relative to each other and thereby changes said first output frequency, and said first output frequency is used by said processor means to determine an indication of the weight of the load.

10. An electronic weighing apparatus according to claim 9, wherein:
one of said first and second piezoelectric transducers is provided with anti-reflection structure to minimize reflection of surface acoustic waves.

11. An electronic weighing apparatus according to claim 10, wherein:
said anti-reflection structure is one of a surface damper on said substrate, an angled cut on an end of said substrate, and a rounded end on said substrate.

12. An electronic weighing apparatus according to claim 9, further comprising:

f) a third piezoelectric transducer having one of a second surface acoustic wave (SAW) transmitter and a second SAW receiver, said third piezoelectric transducer being coupled to said elastic member within said hollowed central portion;

g) a fourth piezoelectric transducer having the other of said second SAW transmitter and said second SAW receiver, said fourth piezoelectric transducer being mounted in close proximity to said first piezoelectric transducer such that said displacement of said elastic member causes a corresponding displacement of one of said third and fourth piezoelectric transducers relative to each other, said displacement being in a direction opposite to and in an amount substantially equal to said relative displacement of said first and second piezoelectric transducers relative to each other;

h) a second amplifier having an input and an output, said input of said second amplifier being coupled to said second SAW receiver and said output of said second amplifier being coupled to said second SAW transmitter such that said third piezoelectric transducer, said second amplifier, and said fourth piezoelectric transducer form a second oscillator having a second output frequency, said output of said second amplifier being coupled to said processor means, wherein
displacement of said elastic member means causes a displacement of one of said third and fourth piezoelectric transducers relative to each other and thereby changes said second output frequency by an opposite but substantially equal amount as said change in said first output frequency, said first and second output frequencies being used by said processor means to determine an indication of the weight of the load.

13. An electronic weighing apparatus according to claim 9, wherein:
one of said first and second substrates is mounted on a thermal sink.

14. An electronic weighing apparatus according to claim 13, wherein:

both of said first and second substrates are mounted on thermal sinks.

15. An electronic weighing apparatus according to claim 13, wherein:
said thermal sink is mounted on a thermally insulating material.

16. An electronic weighing apparatus according to claim 9, wherein:
one of said first and second transducers includes temperature sensing means on said substrate for determining the temperature of said substrate, said temperature sensing means being coupled to said processing means and said temperature being used by said processing means to determine an indication of the weight of the load.

17. An electronic weighing apparatus according to claim 16, wherein:
said temperature sensing means includes a SAW transmitter and a SAW receiver.

18. An electronic weighing apparatus according to claim 16, wherein:
said temperature sensing means is on said first substrate and comprises a SAW receiver.

19. An electronic weighing apparatus according to claim 16, wherein:
said temperature sensing means is on said second substrate and comprises a SAW transmitter.

20. An electronic weighing apparatus according to claim 17, wherein:
said temperature sensing means is located in the same acoustic channel as said first SAW transmitter.

21. An electronic weighing apparatus according to claim 9, further comprising:
f) phase shift means coupled to said first amplifier for shifting the phase of said first output frequency by approximately 180 degrees; and
g) one of frequency and gain detection means coupled to said output of said first amplifier and coupled to said phase shift means for activating said phase shift means upon the detection of a predetermined one of frequency and gain.

22. An electronic weighing apparatus, comprising:
a) a displaceable elastic member means for receiving a load and being displaced by the load such that the displacement of said elastic member means is related to the weight of the load;
b) a first piezoelectric transducer having a first substrate and one of a first surface acoustic wave (SAW) transmitter and a first SAW receiver, said first piezoelectric transducer being coupled to said elastic member;
c) a second piezoelectric transducer having a second substrate and the other of said first SAW transmitter and said first SAW receiver, said second piezoelectric transducer being mounted in close proximity to said first piezoelectric transducer such that said displacement of said elastic member causes a corresponding displacement of one of said first and second piezoelectric transducers relative to each other;
d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency; and e) processor means coupled to said output of said first amplifier, wherein
displacement of said elastic member means causes a displacement of one of said first and second piezoelectric transducers relative to each other and thereby changes said first output frequency, and said first output frequency is used by said processor means to determine an indication of the weight of the load, and wherein
one of said first and second piezoelectric transducers is provided with anti-reflection structure to minimize reflection of surface acoustic waves.

23. An electronic weighing apparatus, comprising:
a) a displaceable elastic member means for receiving a load and being displaced by the load such that the displacement of said elastic member means is related to the weight of the load, said elastic member having a hollowed central portion;
b) a first piezoelectric transducer having a first substrate and one of a first surface acoustic wave (SAW) transmitter and a first SAW receiver, said first piezoelectric transducer being coupled to said elastic member;
c) a second piezoelectric transducer having a second substrate and the other of said first SAW transmitter and said first SAW receiver, said second piezoelectric transducer being mounted in close proximity to said first piezoelectric transducer such that said displacement of said elastic member causes a corresponding displacement of one of said first and second piezoelectric transducers relative to each other;
d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency;
e) processor means coupled to said output of said first amplifier, and
f) a third piezoelectric transducer having one of a second surface acoustic wave (SAW) transmitter and a second SAW receiver, said third piezoelectric transducer being coupled to said elastic member within said hollowed central portion;
g) a fourth piezoelectric transducer having the other of said second SAW transmitter and said second SAW receiver, said fourth piezoelectric transducer being mounted in close proximity to said first piezoelectric transducer such that said displacement of said elastic member causes a corresponding displacement of one of said third and fourth piezoelectric transducers relative to each other, said displacement being in a direction opposite to and in an amount substantially equal to said relative displacement of said first and second piezoelectric transducers relative to each other;
h) a second amplifier having an input and an output, said input of said second amplifier being coupled to said second SAW receiver and said output of said second amplifier being coupled to said second SAW transmitter such that said third piezoelectric transducer, said second amplifier, and said fourth piezoelectric transducer form a second oscillator having a second output frequency, said output of said second amplifier being coupled to said processor means, wherein
displacement of said elastic member means causes a displacement of one of said first and second piezoelectric transducers relative to each other and thereby changes said first output frequency, and said first output frequency is used by said processor means to determine an indication of the weight of the load, and, wherein displacement of said elastic member means causes a displacement of one of said third and fourth piezoelectric transducers relative to each other and thereby changes said second output frequency by an opposite but substantially equal amount as said change in said first output frequency, said first and second output frequencies being used by said processor means to determine an indication of the weight of the load.

24. An electronic weighing apparatus, comprising:

a) a displaceable elastic member means for receiving a load and being displaced by the load such that the displacement of said elastic member means is related to the weight of the load;

b) a first piezoelectric transducer having a first substrate and one of a first surface acoustic wave (SAW) transmitter and a first SAW receiver, said first piezoelectric transducer being coupled to said elastic member;

c) a second piezoelectric transducer having a second substrate and the other of said first SAW transmitter and said first SAW receiver, said second piezoelectric transducer being mounted in close proximity to said first piezoelectric transducer such that said displacement of said elastic member causes a corresponding displacement of one of said first and second piezoelectric transducers relative to each other;

d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency; and e) processor means coupled to said output of said first amplifier, wherein displacement of said elastic member means causes a displacement of one of said first and second piezoelectric transducers relative to each other and thereby changes said first output frequency, and said first output frequency is used by said processor means to determine an indication of the weight of the load, and wherein one of said first and second transducers includes temperature sensing means on said substrate for determining the temperature of said substrate, said temperature sensing means being coupled to said processing means and said temperature being used by said processing means to determine an indication of the weight of the load.

25. An electronic weighing apparatus according to claim 24, wherein:

said temperature sensing means includes a SAW transmitter and a SAW receiver.

26. An electronic weighing apparatus according to claim 24, wherein:

said temperature sensing means is on said first substrate and comprises a SAW receiver.

27. An electronic weighing apparatus according to claim 24, wherein:

said temperature sensing means is on said second substrate and comprises a SAW transmitter.

28. An electronic weighing apparatus according to claim 25, wherein:

said temperature sensing means is located in the same acoustic channel as said first SAW transmitter.

29. An electronic weighing apparatus, comprising:

a) a displaceable elastic member means for receiving a load and being displaced by the load such that the displacement of said elastic member means is related to the weight of the load;

b) a first piezoelectric transducer having a first substrate and one of a first surface acoustic wave (SAW) transmitter and a first SAW receiver, said first piezoelectric transducer being coupled to said elastic member;

c) a second piezoelectric transducer having a second substrate and the other of said first SAW transmitter and said first SAW receiver, said second piezoelectric transducer being mounted in close proximity to said first piezoelectric transducer such that said displacement of said elastic member causes a corresponding displacement of one of said first and second piezoelectric transducers relative to each other;

d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency;

e) processor means coupled to said output of said first amplifier;

f) phase shift means coupled to said first amplifier for shifting the phase of said first output frequency by approximately 180 degrees; and g) one of frequency and gain detection means coupled to said output of said first amplifier and coupled to said phase shift means for activating said phase shift means upon the detection of a predetermined one of frequency and gain, wherein displacement of said elastic member means causes a displacement of one of said first and second piezoelectric transducers relative to each other and thereby changes said first output frequency, and said first output frequency is used by said processor means to determine an indication of the weight of the load.

* * * * *